May 6, 1924.
S. SMITH
CLUTCH
Filed Feb. 5, 1923
1,492,862
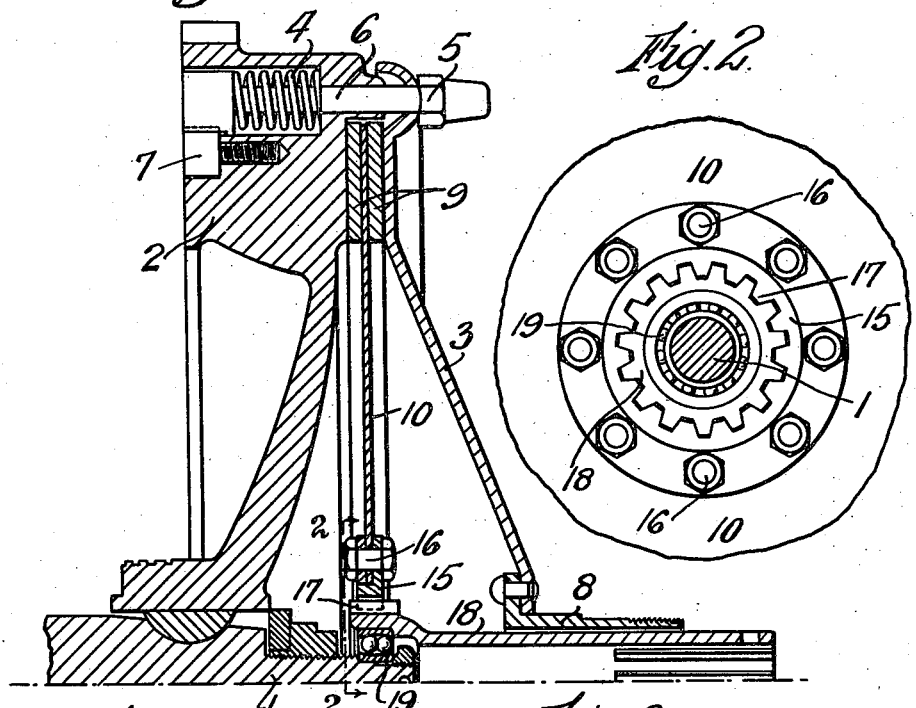
INVENTOR
SYDNEY SMITH,
By his Attorneys,
Baldwin & Wight Patented May 6, 1924.

1,492,862

UNITED STATES PATENT OFFICE.

SYDNEY SMITH, OF LONDON, ENGLAND.

CLUTCH.

Application filed February 5, 1923. Serial No. 617,100.

*To all whom it may concern:*

Be it known that I, SYDNEY SMITH, a subject of the King of Great Britain, residing at 7 Oxford Road, Gunnersbury, London, England, have invented new and useful Improvements in Clutches, of which the following is a specification.

This invention relates to improvements in friction clutches and more especially to automobile clutches of the plate or disc type. My invention is especially applicable to a clutch in which the driven member comprises a single plate or disc.

According to my invention I provide a clutch plate with a plurality of springy tongues which are bent away from the plane of the plate, and in such a direction that when the clutch is slipping in taking up the drive, any point on the driving member, when overrunning a tongue, passes the root of the tongue before reaching the tip thereof. When the clutch is fully in engagement the tongues are flattened or sprung back into the plane of the plate.

In one way of carrying out my invention as applied to a clutch of the type in which the driven member comprises a metal plate, and the driving member a flywheel and a spring loaded clutch cover, the plate is provided with a plurality of pairs of tongues which are bent away from the plane of the plate, one tongue of each pair being bent in one direction and the other tongue in the opposite direction, all the tongues being so arranged that when the clutch is slipping, in taking up the drive, any point on the driving member when overrunning a tongue passes the root of the tongue before reaching the tip thereof.

Each pair of tongues may conveniently be formed by making a slot in the plate extending from the circumference thereof towards the centre in a radial direction and two concentric slits each starting from the slot.

It is obvious that the tongues need not necessarily be opposite each other, and that other detailed changes may be made without departing from the spirit of the invention.

Preferably the corresponding tongues of each successive pair are bent in opposite directions.

The flywheel and the clutch cover may be provided with a "Ferodo" or like lining.

In the accompanying drawing which illustrates the invention Figure 1 is a longitudinal half section, Figure 2 is a section on the line 2—2, Figure 1, Figure 3 is a detail face view of the clutch plate to a smaller scale, and Figure 4 is a detail edge view of Figure 3 looking from the left.

1 is a driving shaft fast on which is a flywheel 2. 3 is a cover plate which is drawn towards the flywheel 2 by springs 4 which are placed under the desired tension by nuts 5 on bolts 6. 7 are screws which prevent the bolts 6 from turning or from coming out of the flywheel 2 if the nuts 5 be removed. 8 is a sleeve secured to the plate 3 and screw threaded at its outer end to receive the usual ring by means of which the plate 3 can be withdrawn from the flywheel 2 by a clutch pedal.

The said ring and clutch pedal form no part of this invention and are so well known that they are not shown in the drawings.

The flywheel 2 and cover plate 3 are faced with a lining 9 of material known under the registered trade mark "Ferodo" or with a lining of like material. The mechanism described forms the driving part of the clutch.

The driven member comprises a plate 10 of springy material having a number of pairs of tongues 11, 12, which are bent away from the plane of the plate 10, as shown in Figure 4, one tongue of each pair being bent in one direction and the other tongue in the opposite direction, the corresponding tongues of each successive pair being bent in opposite directions.

Each pair of tongues 11, 12, is formed by making a slot 13 extending from the circumference of the plate 10 towards the centre in a radial direction and two concentric slits 14 which start from the slot 13.

The arrow in Figure 3 indicates the direction of rotation of the driving shaft 1 and flywheel 2 and it will be observed that when slip takes place between the plate 10 and the flywheel 2 and cover plate 3, any point on the flywheel 2 or plate 3 when overrunning a tongue 11 or 12 passes the root of the tongue before reaching the tip thereof.

The plate 10 is secured to a ring 15 by bolts 16; the ring 15 is provided at its inner circumference with splines 17 which engage smaller splines on a hollow shaft 18. 19 is a ball bearing interposed between the shafts 18 and 1.

What I claim is:—

1. A clutch plate having a plurality of pairs of substantially concentric tongues which are bent away from the plane of the plate and in such a direction that when the clutch is slipping in taking up the drive, any point on the driving member, when overrunning a tongue, passes the root of the tongue before reaching the tip thereof, one tongue of each pair being bent in one direction and the other tongue in the opposite direction.

2. A clutch plate as claimed in claim 1, in which the corresponding tongues of each successive pairs are bent in opposite directions.

In testimony that I claim the foregoing as my invention I have signed by name this 23rd day of January, 1923.

SYDNEY SMITH.